July 1, 1958

L. O. BIRD ET AL 2,840,935

EARTH-WORKING APPARATUS

Filed Oct. 5, 1954

INVENTORS
LEN O. BIRD
BY REX R. BADLEY

AGENT

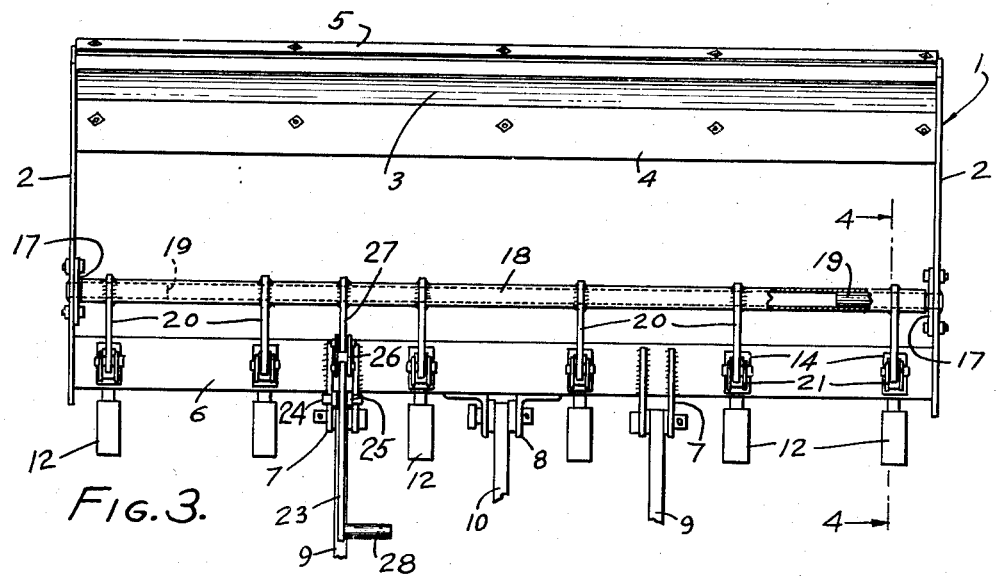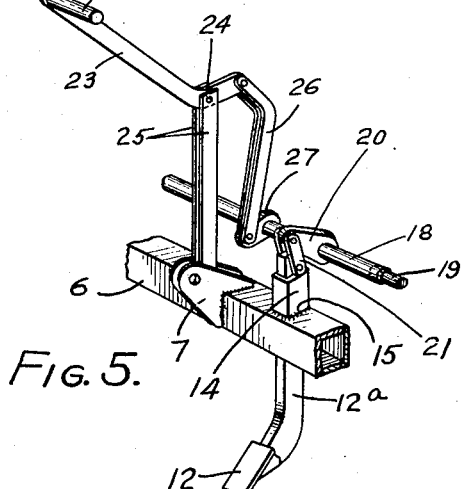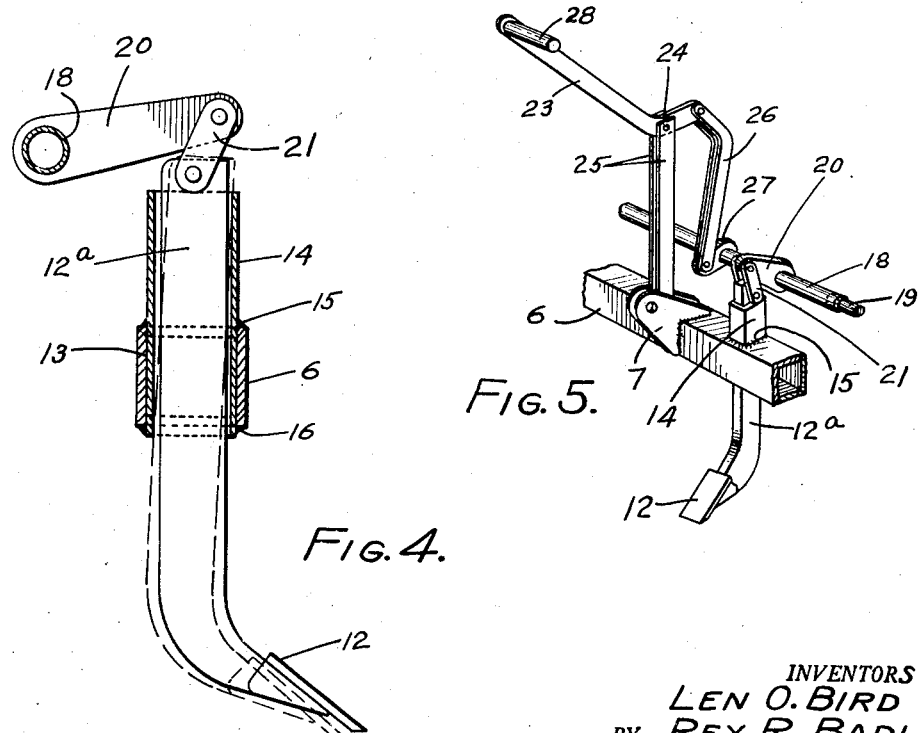

United States Patent Office 2,840,935
Patented July 1, 1958

2,840,935

EARTH-WORKING APPARATUS

Len O. Bird and Rex R. Badley, Glendale, Calif., assignors to Western Equipment Mfg. Co., Glendale, Calif., a corporation of California Application October 5, 1954, Serial No. 460,468

3 Claims. (Cl. 37—145)

Our invention relates to earth-working apparatus and more particularly to means for mounting and controlling the operation of scarifying teeth or similar implements on tractor drawn earth-working apparatus.

It is an object of our invention to provide mounting means for scarifying and similar implements which is an improvement over known means for this purpose in point of comparative strength, ruggedness, reliability of performance, simplicity of construction and adaptability to various types of earth-working apparatus.

It is another object of our invention to provide mounting means of the character described which readily lends itself to the use of simply constructed and efficient means operable from the driver's seat of the tractor for moving the teeth or similar implements into and out of ground-working position.

A further object of our invention is the provision of a combined and interrelated means whereby a drag scraper or similar earth-working apparatus readily may have added thereto at a low cost and without objectionably increasing the bulk and weight thereof, instrumentalities for ripping, scarifying or similarly working the ground.

We will describe only one form of earth-working apparatus embodying our invention, and will then point out the novel features thereof in claims.

In the accompanying drawings:

Fig. 3 is a fragmentary top plan view of the apparatus shown in Fig. 1.

Fig. 4 is an enlarged sectional view taken on the line 4—4 of Fig. 3.

Fig. 5 is a fragmentary perspective view of the operating means for raising and lowering the teeth.

Figure 1:
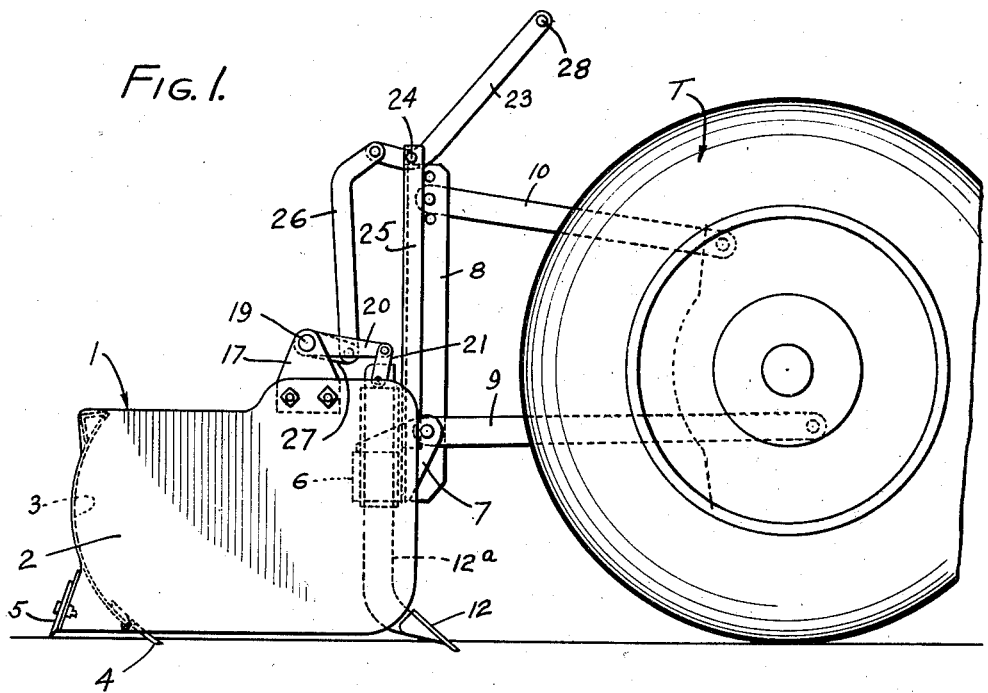
Fig. 1 is a side elevation of earth-working apparatus wherein scarifying teeth arranged and operable in accordance with our invention are mounted on a frame member of a drag scraper, the teeth being shown in operative position.

In the drawings our invention is shown in connection with a drag scraper 1 of the bottomless type. It is to be understood, however, that it may be embodied in other earth-working apparatus wherein it is desired to employ scarifying teeth or similar implements subject to being mounted and operated in accordance with our invention.

The drag scraper here shown includes a "bowl" 1 made up of side walls 2 and a rear wall 3. A scraper blade 4 and a back-fill blade 5 are fixed along opposite sides of the lower edge of the rear wall 3.

A frame or cross bar 6 extends between the side walls 2 and is welded or otherwise rigidly secured thereto above the lower edges thereof.

Clevises 7 and a rigid post 8 are mounted on the bar 6 to provide for connection of the scraper 1 with a tractor T by means of the draft links 9 and a control link 10 of the usual hydraulically operated hitch mechanism on the tractor.

In accordance with our invention, a plurality of scarifying teeth 12 are mounted on the frame bar 6 so that they may be raised and lowered relative thereto. The means by which the shanks of these teeth are mounted on the bar 6 and the means employed for raising the teeth are the essential features of our invention which constitute an improvement in this art as will be apparent as this description progresses.

The bar 6 is box-like and provided with a series of vertical openings 13 extending therethrough for receiving box-like, open-ended socket members 14. These socket members are welded as at 15 and 16 to the upper and lower sides of the bar 6. The lower ends of the socket members extend somewhat below the lower sides of the bar 6 to facilitate the welding thereof to the bar.

The shanks 12a of the teeth 12 are slidable vertically in the socket members 14 whereby the teeth may be raised and lowered. The sockets 14 extend several inches above the top of the bar 6 so as to be above the level of the earth moved by the bowl 1, thereby preventing dirt from dropping into the upper ends of the sockets and interfering with the movement of the teeth in the sockets.

The shanks 12a of the teeth 12 fit loosely in the socket members 14 and when under load during a scarifying operation thereof, will assume an angular position in the sockets as indicated by the dot-dash lines in Fig. 4. This will cause the shanks to bind in the sockets thereby preventing the teeth from being pushed upwardly while scarifying the ground.

In having the socket members 14 mounted within the bar 6 so that opposite sides thereof engage opposite side members of the bar 6, as shown in Fig. 4, the socket members, as well as the bar 6, are reinforced so that rugged and durable mounting means are provided for securely holding the teeth. The strength and efficiency of this mounting of the teeth is enhanced by the length of the socket members and by having approximately the lower half of each socket member disposed within the bar 6 and welded thereto as shown in Fig. 4.

The particular mounting means for the teeth as here provided make it possible to employ a simple but efficient means for raising and lowering the teeth 12. This means is readily operable by the driver of the tractor from the driver's seat.

As here shown the means for raising and lowering the teeth 12 as well as for assisting in mounting and holding the teeth in place includes a rotary horizontal shaft 18 mounted on bearings 19 carried by brackets 17 fixed upon the side walls 2 of the scraper bowl. Crank arms 20 fixed at spaced intervals along the shaft 18 are pivotally connected by means of links 21 with the upper ends of the shanks 12a of the teeth 12. Rotation of the shaft 18 in one direction will cause the crank arms 20 and links 21 to lift the teeth 12 whereas rotation of the shaft in the opposite direction will cause the teeth to be gravitationally lowered.

The shaft 18 mounted as here shown rearwardly of the sockets 13 and connected with the teeth 12 by means of the crank arms 20 and links 21, constitutes with these elements a simply constructed and compact means of low height for raising and lowering the teeth 12 as well as for holding the teeth in place. This operating means readily lends itself to being actuated by manually operable or hydraulically actuated means.

It is preferred, however, to employ a simple and efficient manually operable means which, as here shown, includes a lever 23 fulcrumed as at 24 on upright supporting arms 25 fixed to bar 6 within one of the clevises 7 as shown in Fig. 5. A link 26 pivotally connects one end of the lever 23 with a driving crank arm 27 on the shaft. The other end of the lever 23 is provided with a handle 28 and disposed within reach of the driver of the tractor.

Figure 2:
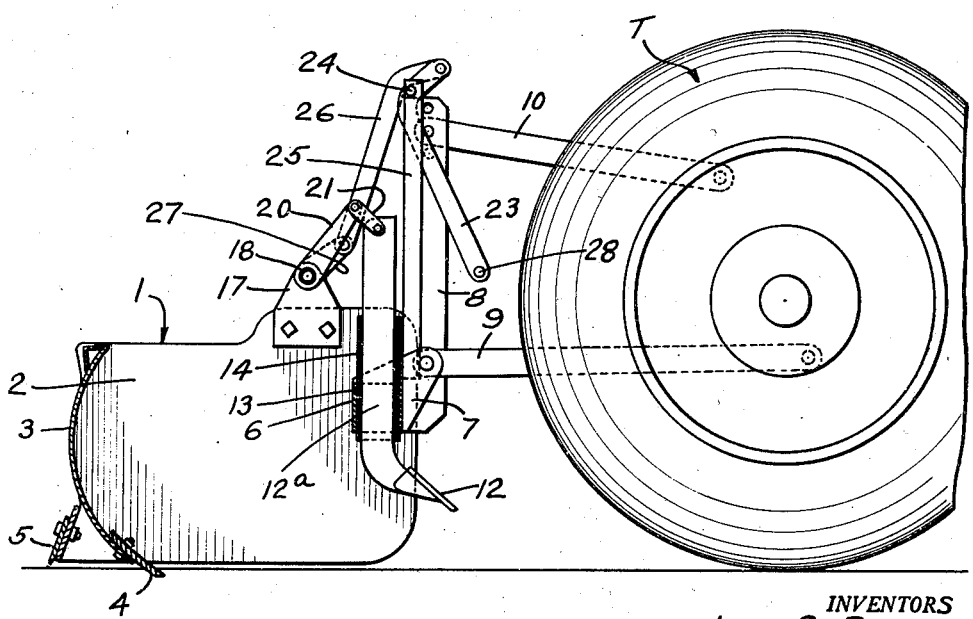
Fig. 2 is a vertical sectional view of the apparatus shown in Fig. 1, with the teeth elevated to an inoperative position.

When the lever 23 is in the elevated position shown in Fig. 1 the teeth are in ground engaging position ready for a scarifying operation. The teeth are readily elevated above the ground as shown in Fig. 2 by rocking the lever to move the handle 28 downwardly to occupy the position shown in Fig. 2. In this position ready access is had to the lever by the tractor driver who may permit the teeth to be gravitationally lowered by lifting the handle end of the lever.

As shown in Figs. 4 and 5 the lower ends of the links 21 act as stops as they are engageable with the upper ends of the sockets 13 to limit the downward movement of the teeth 12.

When the teeth are in raised position as shown in Fig. 2, the pivotal connection of the link 26 with the lever 23 is disposed past center with respect to the fulcrum 24, thereby assuring that the teeth will be maintained in elevated position until the lever is raised sufficiently to move this pivotal connection to a point at which the teeth will gravitate into ground-engaging position.

As it is known that scrapers of the drag type as well as other types have employed ripping or scarifying teeth in advance of the bowls thereof it is deemed unnecessary to describe the operation of the scraper here shown, especially as the particular scraper forms no part of the present invention except as a carrier for an arrangement of teeth constituting the present invention. Thus it is apparent that any frame structure or any earth-working apparatus providing a frame on which the teeth may be mounted and operated as here provided could be used in carrying out the present invention.

We claim:

1. Apparatus for mounting scarifying teeth on earth-working apparatus, including: a bar adapted to be rigidly connected with the earth-working apparatus, a plurality of socket members fixed on said bar; scarifying teeth having shanks slidable in said socket members; and means adapted to be mounted on said apparatus, connected with said shanks and operable to move the teeth relative to said socket members into and out of ground-working position, said means including a rotary shaft, means for mounting said shaft on said earth-working apparatus; and links connecting said shaft with said shanks for so moving said teeth responsive to rotation of said shaft, and means supported on said bar for rotating said shaft, including a post fixed on said bar; a lever fulcrumed on said post, and means connecting said lever with said shaft operable to rotate the shaft responsive to movement of said lever.

2. Apparatus for mounting scarifying teeth on earth-working apparatus, including; a bar adapted to be mounted on earth-working apparatus; scarifying teeth having elongated shanks; said bar being hollow; there being a series of spaced openings in said bar; a plurality of open ended socket members fixed in said openings, said socket members slidably receiving the shanks of said scarifying teeth; a rotatable shaft; means for mounting said shaft on said ground-working apparatus to one side of said bar, and means connected with said shaft and the shanks of the teeth for maintaining the teeth in said socket members as well as for raising and lowering the teeth responsive to rotation of said shaft, an upstanding rigid member fixed on said bar; a lever fulcrumed on said rigid member; a crank arm on said shaft, and a link connecting said lever with said crank arm.

3. Earth-working apparatus including: a bar; scarifying teeth having shanks; means on said bar slidably supporting thereon said shanks for movement relative to the bar; means connected with said shanks operable to move said teeth into and out of engagement with the ground; said last-named means including a shaft; means for rotatably supporting said shaft to one side of said bar, crank arms on said shaft; links connecting said crank arms with said shanks; an upstanding member on said bar, a lever fulcrumed on said upstanding member; a driving crank arm on said shaft, and a link connecting said lever with said driving crank arm.

References Cited in the file of this patent

UNITED STATES PATENTS

| Number | Name | Date |
|---|---|---|
| 312,324 | Brock | Feb. 7, 1885 |
| 319,059 | Brock | June 2, 1885 |
| 1,244,505 | Kincaid | Oct. 30, 1917 |
| 1,441,621 | Barthuli | Jan. 9, 1923 |
| 2,042,196 | Senz | May 26, 1936 |
| 2,081,192 | Allin et al. | May 25, 1937 |
| 2,490,904 | Gustafson | Dec. 13, 1949 |
| 2,566,562 | Hale | Sept. 4, 1951 |